(12) United States Patent
Yang

(10) Patent No.: US 10,370,269 B2
(45) Date of Patent: Aug. 6, 2019

(54) WATER FILTRATION SYSTEM

(71) Applicants: FOSHAN SHUNDE MIDEA WATER DISPENSER MFG. CO., LTD., Foshan (CN); MIDEA GROUP CO., LTD., Foshan (CN)

(72) Inventor: Lyu Yang, Foshan (CN)

(73) Assignees: FOSHAN SHUNDE MIDEA WATER DISPENSER MFG. CO., LTD., Foshan, Guangdong (CN); MIDEA GROUP CO., LTD, Foshan, Guangdong (CN)

( * ) Notice: Subject to any disclaimer, the term of this patent is extended or adjusted under 35 U.S.C. 154(b) by 0 days.

(21) Appl. No.: 15/861,530

(22) Filed: Jan. 3, 2018

(65) Prior Publication Data

US 2018/0257955 A1    Sep. 13, 2018

Related U.S. Application Data

(63) Continuation of application No. PCT/CN2017/087304, filed on Jun. 6, 2017.

(30) Foreign Application Priority Data

Mar. 7, 2017 (CN) .......................... 2017 1 0132249
Mar. 7, 2017 (CN) .......................... 2017 2 0218894

(51) Int. Cl.
*C02F 1/44* (2006.01)
*C02F 1/00* (2006.01)
(Continued)

(52) U.S. Cl.
CPC .............. *C02F 1/44* (2013.01); *B01D 61/027* (2013.01); *B01D 61/08* (2013.01); *B01D 63/06* (2013.01);
(Continued)

(58) Field of Classification Search
CPC . C02F 1/44; C02F 9/005; C02F 1/003; B01D 61/08; B01D 63/06; B01D 61/027
See application file for complete search history.

(56) References Cited

U.S. PATENT DOCUMENTS

2016/0083278 A1   3/2016  Lu et al.
2016/0361673 A1   12/2016 Cai et al.

FOREIGN PATENT DOCUMENTS

AU          692750 B3      6/1998
CN          203728658 U    7/2014
            (Continued)

OTHER PUBLICATIONS

Midea, International Search Report and Written Opinion, dated Dec. 8, 2017, 13 pgs.

(Continued)

*Primary Examiner* — Chester T Barry
(74) *Attorney, Agent, or Firm* — Morgan, Lewis & Bockius LLP

(57) ABSTRACT

A water filtration system (100) includes: a raw water inlet (100a); a pure water outlet (100b); a purified water outlet (100c); a waste water outlet (100d); and an integrated filter cartridge (1) having first (10a) through fourth ports (10d), in which the first port (10a) is connected to the raw water inlet (100a), the second port (10b) is connected to the pure water outlet (100b), the purified water outlet (100c) and the waste water outlet (100d) are both connected to the third port (10c), and a water storage device (2) is disposed to at least one of a flow path connected to the pure water outlet (100b) and the fourth port (10d).

10 Claims, 1 Drawing Sheet

(51) Int. Cl.
    *B01D 61/08*     (2006.01)
    *B01D 61/02*     (2006.01)
    *B01D 63/06*     (2006.01)
    *C02F 9/00*     (2006.01)

(52) U.S. Cl.
    CPC .............. *C02F 1/003* (2013.01); *C02F 9/005* (2013.01); *C02F 1/001* (2013.01); *C02F 1/441* (2013.01); *C02F 1/442* (2013.01); *C02F 2201/006* (2013.01); *C02F 2209/005* (2013.01); *C02F 2209/03* (2013.01); *C02F 2209/42* (2013.01); *C02F 2307/10* (2013.01)

(56) References Cited

FOREIGN PATENT DOCUMENTS

| | | |
|---|---|---|
| CN | 203807257 U | 9/2014 |
| CN | 204434390 U | 7/2015 |
| CN | 105036400 A | 11/2015 |
| CN | 105600965 A | 5/2016 |
| CN | 205516831 U | 8/2016 |
| CN | 205635100 U | 10/2016 |

OTHER PUBLICATIONS

Foshan Shunde Midea Water Dispenser Mfg. Co. Ltd., Extended European Search Report, EP17746361.9, dated Jun. 27, 2018, 8 pgs.
Notification of Reason for Refusal, KR1020177023399, dated Nov. 21, 2018, 13 pgs.

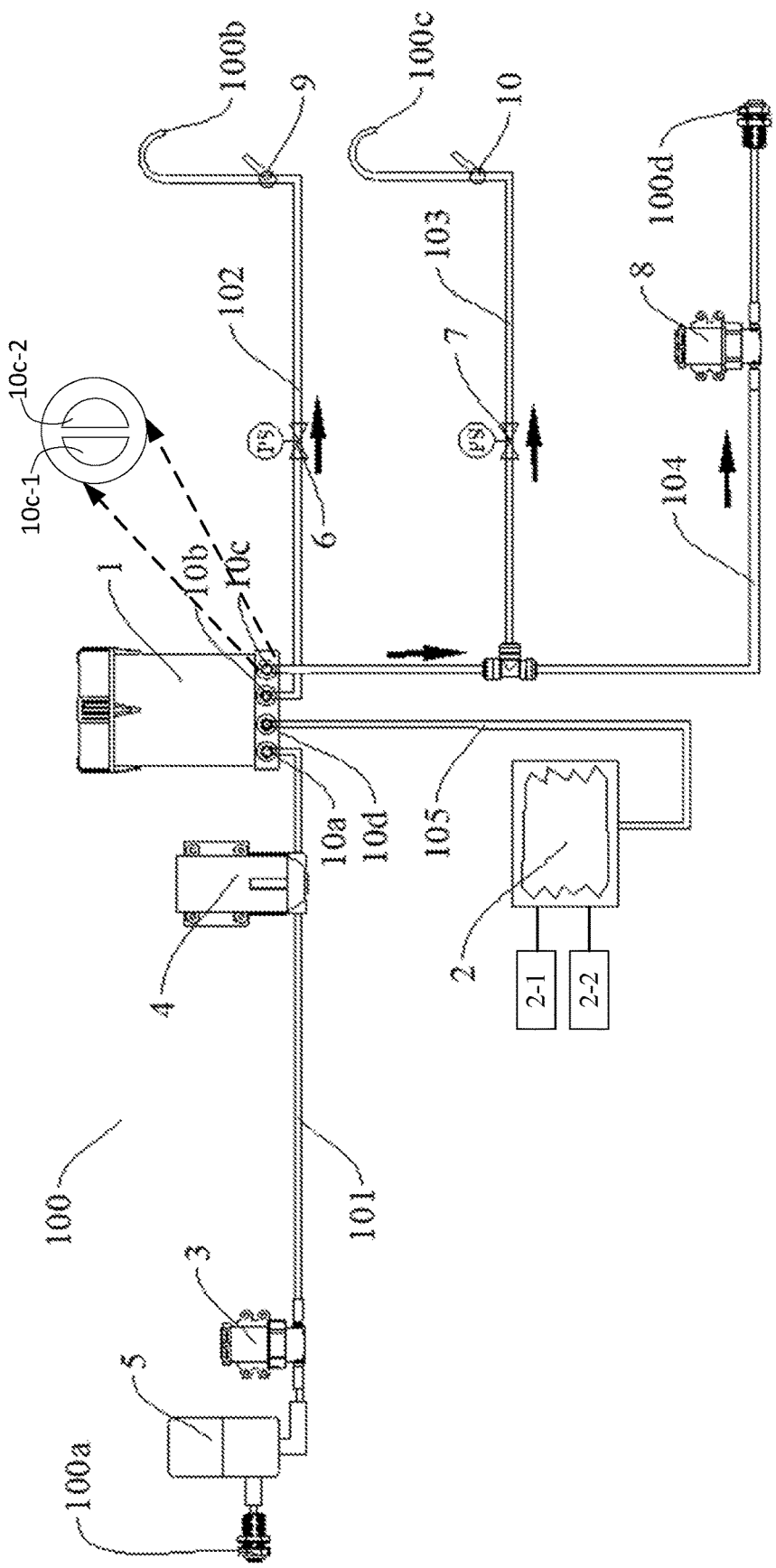

WATER FILTRATION SYSTEM

PRIORITY CLAIM AND RELATED APPLICATION

This application is a continuation application of PCT/CN2017/087304, entitled "WATER FILTRATION SYSTEM" filed on Jun. 6, 2017, which claims priority to Chinese Patent Application No. 201720218894.0, filed with the State Intellectual Property Office of the People's Republic of China on Mar. 7, 2017, and entitled "WATER FILTRATION SYSTEM", and Chinese Patent Application No. 201710132249.1, filed with the State Intellectual Property Office of the People's Republic of China on Mar. 7, 2017, and entitled "WATER FILTRATION SYSTEM", the entirety of which are incorporated herein by reference in their entirety.

TECHNICAL FIELD

The present disclosure relates to a technical field of water purification, and more particularly to a water filtration system.

BACKGROUND

In the related art, a water filtration system of a water purifier can usually obtain one kind of water quality. However, in addition to drinking water, a user also needs other domestic water, such as water for washing clothes, so the water filtration system, which can only obtain one kind of water quality, cannot satisfy a requirement of the user. Furthermore, when the user needs a large amount of water, the water filtration system cannot produce a large amount of water for use by the user in a short period of time.

SUMMARY

Embodiments of the present disclosure seek to solve at least one of the problems existing in the related art. Thus, the present disclosure is to propose a water filtration system which can satisfy a requirement of a user for a large amount of water, and can improve a utilization rate of water resources.

The water filtration system according to embodiments of the present disclosure, includes: a raw water inlet; a pure water outlet; a purified water outlet; a waste water outlet; and an integrated filter cartridge including a pre-filter cartridge, a fine filter cartridge and a post-filter cartridge, and having a first port, a second port, a third port, and a fourth port, in which the first port is connected to the raw water inlet, the second port is connected to the pure water outlet, the purified water outlet and the waste water outlet are both connected to the third port, raw water entering through the raw water inlet is configured to flow out through the pure water outlet after filtered by the pre-filter cartridge, the fine filter cartridge and the post-filter cartridge successively, the raw water entering through the raw water inlet is configured to flow out through the purified water outlet after only filtered by the pre-filter cartridge, and a water storage device is disposed to at least one of a flow path connected to the pure water outlet and the fourth port.

In the water filtration system according to embodiments of the present disclosure, by disposing the water storage device to at least one of the flow path connected to the pure water outlet and the fourth port of the water filtration system, the requirement of the user for a large amount of water can be satisfied. Furthermore, the water filtration system can obtain water of two kinds of water quality, i.e. the pure water and the purified water, which improves the utilization rate of the water resources, and achieves water conservation.

According to some embodiments of the present disclosure, a water inlet valve and a booster pump are provided between the first port and the raw water inlet, and the water inlet valve is located upstream of the booster pump. Thus, the water filtration system can obtain water of two kinds of water quality, i.e. the pure water and the purified water, to improve the utilization rate of the water resources.

According to some embodiments of the present disclosure, the water storage device is provided with a detection device, and when the detection device detects that the water storage device is not full of liquid, a controller of the water filtration system opens the water inlet valve and operates the booster pump. Thus, an automatic water storage function of the water filtration system is achieved.

According to some embodiments of the present disclosure, the detection device is configured as a pressure sensor or a liquid level sensor, so that the water filtration system is more intelligent.

According to some embodiments of the present disclosure, a pre-filtering mesh is disposed between the raw water inlet and the water inlet valve. Thus, the pre-filtering mesh can protect the water inlet valve and the booster pump.

According to some embodiments of the present disclosure, the third port comprises a first sub-port and a second sub-port independent from each other, the purified water outlet is connected to the first sub-port, and the waste water outlet is connected to the second sub-port. Thus, the utilization rate of water resources can be improved.

According to some embodiments of the present disclosure, a first one-way valve and a first high pressure switch are provided between the second port and the pure water outlet, and the first one-way valve and the first high pressure switch are integrated together. Thus, components of the water filtration system can be reduced and the water filtration system can be simplified.

According to some embodiments of the present disclosure, a second one-way valve and a second high pressure switch are provided between the third port and the purified water outlet, and the second one-way valve and the second high pressure switch are integrated together. Thus, components of the water filtration system can be further reduced and the water filtration system can be further simplified.

According to some embodiments of the present disclosure, the water storage device is configured as a water storage bag, a pressure tank or a water tank. Thus, the water storage device can be selectively provided according to practical situations to better satisfy practical requirements.

According to some embodiments of the present disclosure, the fine filter cartridge is configured as a reverse osmosis filter cartridge or a nanofiltration membrane cartridge. Thus, the water quality of the pure water is ensured, and further health of the user is ensured.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 illustrates a schematic view of a water filtration system according to an embodiment of the present disclosure.

REFERENCE NUMERALS

100: water filtration system
100a: raw water inlet;
100b: pure water outlet;
100c: purified water outlet;
100d: waste water outlet;
101: raw water flow path;
102: pure water flow path;
103: purified water flow path;
104: waste water flow path;
105: water storage flow path;
1: integrated filter cartridge;
10a: first port;
10b: second port;
10c: third port;
10d: fourth port;
2: water storage device;
3: water inlet valve;
4: booster pump;
5: pre-filtering mesh;
6: first one-way valve and high pressure switch;
7: second one-way valve and high pressure switch;
8: waste water solenoid valve;
9: pure water valve;
10: purified water valve.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

Thus, features limited by "first" and "second" are intended to indicate or imply including one or more than one these features. In the description of the present disclosure, "a plurality of" means two or more than two, unless specified otherwise.

In the present disclosure, unless specified or limited otherwise, the terms "connected," "coupled" and the like are used broadly, and may be, for example, fixed connections, detachable connections, or integral connections; may also be mechanical or electrical connections; may also be direct connections or indirect connections via intervening structures; may also be inner communications of two elements. These having ordinary skills in the art should understand the specific meanings in the present disclosure according to specific situations.

A water filtration system 100 according to embodiments of the present disclosure will be described below with reference to FIG. 1.

As shown in FIG. 1, the water filtration system 100 according to embodiments of the present disclosure includes a raw water inlet 100a, a pure water outlet 100b, a purified water outlet 100c, a waste water outlet 100d and an integrated filter cartridge 1.

The integrated filter cartridge 1 includes a pre-filter cartridge, a fine filter cartridge and a post-filter cartridge. The integrated filter cartridge 1 has a first port 10a, a second port 10b, a third port 10c, and a fourth port 10d. The first port 10a is connected to the raw water inlet 100a. The second port 10b is connected to the pure water outlet 100b. The purified water outlet 100c and the waste water outlet 100d are both connected to the third port 10c. After filtered by the pre-filter cartridge, the fine filter cartridge and the post filter cartridge successively, raw water entering through the raw water inlet 100a is configured to flow out through the pure water outlet 100b; after only filtered by the pre-filter cartridge, the raw water entering through the raw water inlet 100a is configured to flow out through the purified water outlet 100c. At least one of a flow path connected to the pure water outlet 100b and the fourth port 10d is provided with a water storage device 2.

It should be noted herein that the resulting water is "pure water" after the raw water is filtered by the pre-filter cartridge, the fine filter cartridge and the post-filter cartridge of the integrated filter cartridge 1, which can be drunk directly; the resulting water is "purified water" after the raw water is only filtered by the pre-filter cartridge of the integrated filter cartridge 1, which can serve as domestic water, such as water for washing clothes, for flushing a toilet, etc.

For example, as shown in FIG. 1, the water filtration system 100 may further include a raw water flow path 101, a pure water flow path 102, a purified water flow path 103, a waste water flow path 104 and a water storage flow path 105. Specifically, the first port 10a of the integrated filter cartridge 1 is connected to the raw water inlet 100a through the raw water flow path 101; the second port 10b of the integrated filter cartridge 1 is connected to the pure water outlet 100b through the pure water flow path 102; the third port 10c of the integrated filter cartridge 1 is connected to the purified water outlet 100c through the purified water flow path 103, and the third port 10c is connected to the waste water outlet 100d through the waste water flow path 104; the water storage device 2 is disposed to the water storage flow path 105, and the water storage device 2 is connected to the fourth port 10d of the integrated filter cartridge 1 through the water storage flow path 105. Further, a pure water valve 9 is disposed at the pure water outlet 100b to achieve opening and closing of the pure water outlet 100b. Also, a purified water valve 10 is disposed at the purified water outlet 100c to achieve opening and closing of the purified water outlet 100c, and a waste water valve is disposed to the waste water flow path 104 to achieve opening and closing of the waste water outlet 100d. Optionally, the waste water valve is a waste water solenoid valve 8, and the waste water solenoid valve 8 is in an off state normally, in which case a small hole is defined in the waste water solenoid valve 8 to ensure communication of the waste water flow path 104, and to maintain a water inlet pressure in the integrated filter cartridge 1 before the fine filter cartridge. It should be understood that, the specific structure and working principle of the waste water solenoid valve 8 is well known to those skilled in the art, which will not be described herein.

When the purified water is needed, the purified water valve 10 is opened while the pure water valve 9 remains in an off state, such that the raw water flows from the raw water inlet 100a into the integrated filter cartridge 1 successively through the raw water flow path 101 and the first port 10a, and becomes pure water after filtered by the pre-filter cartridge, the fine filter cartridge and the post-filter cartridge; the pure water flows out of the integrated filter cartridge 1 through the second port 10b, and flows out successively through the pure water flow path 102 and the pure water outlet 100b for use by the user. The pure water can be directly used as drinking water. In this process, the waste water produced flows out of the integrated filter cartridge 1 through the third port 10c, and flows out successively through the waste water flow path 104 and the waste water outlet 100d. The raw water entering through the first port 10a can be preliminarily filtered by the pre-filter cartridge, and for example, the-pre filter cartridge can effectively remove rust, sediment, colloid in the water and absorb residual chlorine, part of organic matter and the like in the water. The water preliminarily filtered by the pre-filter cartridge can be finely filtered by the fine filter cartridge, and for example, the fine filter cartridge can effectively remove bacteria, viruses, heavy metal ions and the like in the water. The water finely filtered by the fine filter cartridge can be further filtered by the post-filter cartridge, and for example, the post-filter cartridge can effectively remove residual chlorine and organic matter to improve the taste of water.

When the purified water is needed, the purified water valve 10 is opened while the pure water valve 9 remains in an off state. The raw water flows from the raw water inlet 100a into the integrated filter cartridge 1 successively through the raw water flow path 101 and the first port 10a. The raw water becomes the purified water after filtered by the pre-filter cartridge. The purified water flows out of the integrated filter cartridge 1 through the third port 10c, and flows out successively through the purified water flow path 103 and the purified water outlet 100c. The purified water can serve as daily domestic water for the user, such as the water for washing clothes etc. In this process, a small amount of waste water or basically no waste water is produced.

As can be seen from the above, the water filtration system 100 can obtain water of two kinds of water quality, i.e. the pure water and the purified water used for different purposes, which thus can fully utilize water resources, improve a utilization rate of water resources, and achieve water conservation.

When a large amount of water is needed, a certain amount of water can be stored in the water storage device 2 in advance. Specially, the pure water valve 9 can be closed, and meanwhile the purified water valve 10 can be closed. The raw water flows from the raw water inlet 100a into the integrated filter cartridge 1 successively through the raw water flow path 101 and the first port 10a, flows out of the integrated filter cartridge 1 through the fourth port 10d after filtered by the pre-filter cartridge and the fine filter cartridge, and flows into the water storage device 2 for storage through the water storage flow path 105 until the water storage device 2 is full of water. In this process, the waste water produced can also flow out of the integrated filter cartridge 1 through the third port 10c, and flows out successively through the waste water flow path 104 and the waste water outlet 100d. By providing the water storage device 2, when the pure water valve 9 is opened and the purified water valve 10 remains in the off state, the water storage device 2 can feed the water in the water storage device 2 into the integrated filter cartridge 1 again successively through the water storage flow path 105 and the fourth port 10d by means of pressure (for example, the pressure is applied to the water in the water storage device 2 by the user or other devices) or other powers. The water becomes the pure water after filtered by the post-filter cartridge, and flows out successively through the pure water flow path 102 and the pure water outlet 100b, which thus satisfies the requirement of the user for a large amount of water.

Certainly, the present disclosure is not limited to this. The water storage flow path 105 at the fourth port 10d and the pure water flow path 102 can be provided with the water storage device 2 separately (not illustrated), so as to further satisfy the requirement of the user for a large amount of water. Alternatively, the water filtration system 100 may also not include the water storage flow path 105, in which case the water storage device 2 can be disposed to the pure water flow path 102 (not illustrated). In this case, the requirement of the user for a large amount of water can also be well satisfied and the water filtration system 100 has relatively few components, which reduces an occupied space of the whole water filtration system 100 and saves the costs.

In the water filtration system 100 according to embodiments of the present disclosure, by disposing the water storage device 2 to at least one of the flow path connected to the pure water outlet 100b and the fourth port 10d of the water filtration system 100, the requirement of the user for a large amount of water can be satisfied. Meanwhile, the integrated filter cartridge 1 is provided with the first port 10a, the second port 10b and the third port 10c, the first port 10a is connected to the raw water inlet 100a of the water filtration system 100, the second port 10b is connected to the pure water outlet 100b, and the purified water outlet 100c and the waste water outlet 100d are both connected to the third port 10c, so that the water filtration system 100 can obtain water of two kinds of water quality, i.e. the pure water and the purified water used for different purposes, and the water resources can be fully utilized, which improves the utilization rate of the water resources and achieves the water conservation. In addition, by employing the integrated filter cartridge 1 composited of the pre-filter cartridge, the fine filter cartridge and the post-filter cartridge, the integrated filter cartridge 1 is configured as an integrated structure, which facilitates replacement of the integrated filter cartridge 1, reduces a volume of the integrated filter cartridge 1, and meanwhile simplifies the connection between flow paths of the water filtration system 100 to improve the applicability of the water filtration system 100.

In some embodiments of the present disclosure, a water inlet valve 3 and a booster pump 4 are provided between the first port 10a and the raw water inlet 100a, and the water inlet valve 3 is located upstream of the booster pump 4. Herein, it should be noted that, "upstream" may be construed as being upstream of a flowing direction of the water. For example, as shown in FIG. 1, the water inlet valve 3 and the booster pump 4 are disposed along the raw water flow path 101 and spaced apart from each other. The water inlet valve 3 is configured to control the communication and blockage of the raw water flow path 101. When the water inlet valve 3 is opened, the raw water can flow into the integrated filter cartridge 1 for filtration through the raw water flow path 101; when the water inlet valve 3 is closed, the raw water cannot flow into the integrated filter cartridge 1. The booster pump 4 is configured to improve a pressure of the raw water to ensure that the purified water filtered by the pre-filter cartridge can permeate into the fine filter cartridge for filtration. Specifically, when the water inlet valve 3 is opened and the booster pump 4 operates, the raw water flowing to the integrated filter cartridge 1 has a larger pressure, so that the purified water filtered by the pre filter cartridge can smoothly permeate into the fine filter cartridge for filtration. In this case, the pure water obtained can flow out successively through the second port 10b, the pure water flow path 102 and the pure water outlet 100b. When the water inlet valve 3 is opened and the booster pump 4 stops operating, only the purified water can be obtained, and the purified water obtained can flow out successively through the third port 10*c*, the purified water flow path 103 and the purified water outlet 100*c*. Thus, the water filtration system 100 can obtain water of two kinds of water quality, i.e. the pure water and the purified water, to improve the utilization rate of water resources. The water inlet valve 3 may be configured as a solenoid valve, but it is not limited to this.

It should be understood that, the water inlet valve 3 and the booster pump 4 may not be disposed between the first port 10*a* and the raw water inlet 100*a*. In this case, the waste water valve requires to be disposed to the waste water flow path 104. The waste water valve can be configured as a waste water manual valve, the purified water valve 10 can be configured as a purified water manual valve, and the pure water valve 9 can be configured as a pure water manual valve, so that it is only necessary to adjust opening and closing of the purified water manual valve, the pure water manual valve and the waste water manual valve without need for any electric equipment such as the booster pump 4 during the use of the water filtration system 100, which achieves the purpose of saving electricity and costs. Specifically, when the purified water is needed, the purified water manual valve can be opened while the pure water manual valve remains in the off state, such that the raw water flows into the integrated filter cartridge 1 for filtration after successively flowing through the raw water flow path 101 and the first port 10*a*, and the purified water obtained after filtration flows out through the third port 10*c*, and flows out successively through the purified water flow path 103 and the purified water outlet 100*c* for use by the user, in which case basically no waste water is produced, and the waste water manual valve can remain in the off state; when the pure water is needed, the pure water manual valve and the waste water manual valve can be opened while the purified water manual valve remains in the off state, such that the raw water can permeate into the fine filter cartridge for filtration by means of its own pressure, flow out of the integrated filter cartridge 1 through the second port 10*b*, and finally flow out successively through the pure water flow path 102 and the pure water outlet 100*b* for use by the user, and at the same time the waste water flows out successively through the waste water flow path 104 and the waste water outlet 100*d*.

Similarly, it is possible that merely the water inlet valve 3 is disposed between the first port 10*a* and the raw water inlet 100*a* while the booster pump 4 is not disposed between the first port 10*a* and the raw water inlet 100*a*. The water inlet valve 3 can be configured as a water inlet manual valve, the purified water valve 10 can be configured as the purified water manual valve, and the pure water valve 9 can be configured as the pure water manual valve, so that it is only necessary to adjust opening and closing of the purified water manual valve, the pure water manual valve and the water inlet manual valve without need for any electric equipment such as the booster pump 4 during the use of the water filtration system 100, which achieves the purpose of saving electricity and costs. Specifically, when the purified water is needed, the water inlet manual valve and the purified water manual valve can be opened, and the pure water manual valve remains in the off state, such that the raw water flows into the integrated filter cartridge 1 for filtration after successively passing through the raw water flow path 101 and the first port 10*a*, and the purified water obtained after filtration flows out through the third port 10*c*, and flows out successively through the purified water flow path 103 and the purified water outlet 100*c* for use by the user, in which case basically no waste water is produced; when the pure water is needed, the water inlet manual valve and the pure water manual valve can be opened while the purified water manual valve remains in the off state, such that the raw water can permeate into the fine filter cartridge for filtration by means of its own pressure, flow out of the integrated filter cartridge 1 through the second port 10*b*, and finally flow out successively through the pure water flow path 102 and the pure water outlet 100*b* for use by the user, and at the same time the waste water flows out successively through the waste water flow path 104 and the waste water outlet 100*d*. However, the present disclosure is not limited to this.

Further, the water storage device 2 is provided with a detection device 2-1. When the detection device detects that the water storage device 2 is not full of liquid, a controller 2-2 of the water filtration system 100 will control the water inlet valve 3 to open and control the booster pump 4 to operate. Thus, by providing the water storage device 2 with the detection device that can detect whether the water storage device 2 is full of the liquid, an automatic water storage function of the water filtration system 100 can be achieved so as to satisfy a requirement of water supply.

For example, as shown in FIG. 1, the pure water valve 9 is closed, the purified water valve 10 is closed, and the detection device can detect in real time whether the water stored in the water storage device 2 has filled up the water storage device 2. When the detection device detects that the water storage device 2 is not full of the water, a signal will be transmitted to the controller by the detection device, and the controller controls the water inlet valve 3 to open and controls the booster pump 4 to start, such that the raw water can flow into the integrated filter cartridge 1, flows out of the integrated filter cartridge 1 through the fourth port 10*d* after filtered by pre-filter cartridge and the fine filter cartridge, and finally flows into the water storage device 2 for storage through the water storage flow path 105 until the water storage device 2 is full. When the detection device detects that the water storage device 2 is full of the water, a signal will be transmitted to the controller, and the controller will control the water inlet valve 3 to close and control the booster pump 4 to stop operating.

Optionally, the detection device is configured as a pressure sensor or a liquid level sensor. The pressure sensor can be configured to detect the pressure of the liquid in the water storage device 2, and the liquid level sensor can be configured to detect a liquid level of the liquid in the water storage device 2, so that the water filtration system 100 is more intelligent, which greatly facilitates the user.

When the detection device is configured as the pressure sensor, and the pressure detected by the pressure sensor is smaller than a set value thereof (for example, the pressure of the liquid when the water storage device 2 is full of the liquid is configured as the set value), the controller controls the water inlet valve 3 to open and controls the booster pump 4 to start, such that the raw water flows into the water storage device 2 after filtered by the pre-filter cartridge and the fine filter cartridge successively, until the water storage device 2 is full of the water; when the pressure detected by the pressure sensor reaches the set value thereof, the controller controls the water inlet valve 3 to close and controls the booster pump 4 to stop operating.

When the detection device is configured as the liquid level sensor, and the liquid level detected by the liquid level sensor is lower than a preset value thereof (for example, the liquid level of the liquid when the water storage device 2 is full of the liquid is configured as the preset value), the controller controls the water inlet valve 3 to open and controls the booster pump 4 to start, such that the raw water flows into the water storage device 2 after filtered by the pre-filter cartridge and the fine filter cartridge successively, and the amount of the water in the water storage device 2 increases gradually until the water storage device 2 is full of the water; when the liquid level detected by the liquid level sensor reaches the presetting value thereof, the controller controls the water inlet valve 3 to close and controls the booster pump 4 to stop operating.

It should be understood that, the water storage device 2 may not be provided with any detection device. For example, the water storage device 2 is transparent, so that the user can observe the water level in the water storage device 2 directly. When the user observes that the water storage device 2 is not full of liquid, i.e., the water level is low, the water inlet manual valve is opened while the pure water manual valve and the purified water manual valve both remain in the off state, so as to achieve the water storage function of the water storage device 2. However, the present disclosure is not limited to this. Thus, the detection of the water storage of the water storage device 2 may not need any electric detection devices, such as the pressure sensor or the liquid level sensor, during the use of the water filtration system 100, thereby further achieving the purpose of saving electricity and costs.

In further embodiments of the present disclosure, as shown in FIG. 1, a pre-filtering mesh 5 is disposed between the raw water inlet 100*a* and the water inlet valve 3, and the pre-filtering mesh 5 can filter macroscopic objects in the raw water, for example, large particle impurities such as rust, so that the raw water flow path 101 can be prevented from being clogged, and the water inlet valve 3 and the booster pump 4 can be prevented from being worn by the impurities in the raw water so as to protect the water inlet valve 3 and the booster pump 4.

In some embodiments of the present disclosure, as depicted in FIG. 1, the third port 10*c* includes a first sub-port 10*c*-1 and a second sub-port 10*c*-2; the purified water outlet 100*c* is connected to the first sub-port 10*c*-1, and the waste water outlet 100*d* is connected to the second sub-port 10*c*-2. In this case, the purified water outlet 100*c* is connected to the first sub-port 10*c*-1 through the purified water flow path 103, the waste water outlet 100*d* is connected to the second sub-port 10*c*-2 through the waste water flow path 104, and the purified water flow path 103 and the waste water flow path 104 are two flow paths separated from each other. Since the first sub-port 10*c*-1 and the second sub-port 10*c*-2 are separated from each other, all the purified water filtered by the pre-filter cartridge can flow out through the purified water outlet 100*c* without outflow of the waste water, thereby further improving the utilization rate of water resources. Certainly, the purified water flow path 103 and the waste water flow path 104 may also share a part of flow path. For example, in an example shown in FIG. 1, the purified water flow path 103 and the waste water flow path 104 can be connected by means of a three-way tube. An end of the three-way tube is connected to the third port 10*c*, and the other two ends of the three-way tube are connected to the purified water outlet 100*c* and the waste water outlet 100*d* respectively, so that joints of pipelines can be reduced, which simplifies the water path of the water filtration system 100, and improves the reliability of the water filtration system 100.

In some embodiments of the present disclosure, a first one-way valve and a first high pressure switch are provided between the second port 10*b* and the pure water outlet 100*b*, and the first one-way valve and the first high pressure switch are integrated together; a second one-way valve and a second high pressure switch are provided between the third port 10*c* and the purified water outlet 100*c*, and the second one-way valve and the second high pressure switch are integrated together. The first one-way valve can prevent the pure water in the pure water flow path 102 from flowing back into the integrated filter cartridge 1; the second one-way valve can prevent the purified water in the purified water flow path 103 from flowing back into the integrated filter cartridge 1; the first high pressure switch and the second high pressure switch can detect pressures at their own locations, and transmit detection signals to the controller that controls operations of the water inlet valve 3 and the booster pump 4, so that feedback controls of the water inlet valve 3 and the booster pump 4 are achieved.

For example, in the example shown in FIG. 1, the first one-way valve and the first high pressure switch between the second port 10*b* and the pure water outlet 100*b* are integrated into a first one-way valve and high pressure switch 6, a second one-way valve and high pressure switch 7 is disposed between the third port 10*c* and the purified water outlet 100*c*, and the second one-way valve and high pressure switch 7 is integrated by the second one-way valve and the second high pressure switch. Thus, by integrating the first one-way valve and the first high pressure switch into a whole, and integrating the second one-way valve and the second high pressure switch into a whole, the number of components of the water filtration system 100 is reduced, which simplifies the water filtration system 100.

When the pure water is needed, the pure water valve 9 can be opened while the purified water valve 10 remains in the off state. The first high pressure switch can detect that the pressure at its location is smaller than a set pressure p1, in which the set pressure p1 can satisfy: 0.2 MPA≤p1≤0.25 MPa, and transmit a signal to the controller, and the controller controls the water inlet valve 3 to open and controls the booster pump 4 to operate, such that the raw water flows from the raw water inlet 100*a* into the integrated filter cartridge 1 successively through the raw water flow path 101 and the first port 10*a*, and becomes the pure water after filtered by the integrated filter cartridge 1, and the pure water finally flows out through the pure water outlet 100*b* for direct drinking by the user. Then, the pure water valve 9 can be closed; since the first one-way valve limits backflow of the water, the pressure at the location of the first high pressure switch increases gradually; when the foregoing pressure reaches the set pressure p1, the first high pressure switch transmits a signal to the controller, and the controller controls the water inlet valve 3 to close and controls the booster pump 4 to stop operating. It should be understood that, the set pressure p1 of the first high pressure switch may be set according to practical requirements to better satisfy the requirement of the user.

When the purified water is needed, the purified water valve 10 is opened while the pure water valve 9 remains in the off state, the second high pressure switch can detect that the pressure at its location is smaller than a set pressure p2, in which the set pressure p2 can satisfy: 0.2 MPa≤p2≤0.25 MPa, and transmit a signal to the controller, and the controller controls the water inlet valve 3 to open and controls the booster pump 4 to stop operating, such that the raw water flows from the raw water inlet 100*a* into the integrated filter cartridge 1 successively through the raw water flow path 101 and the first port 10*a*, and becomes the purified water after filtered by the pre-filter cartridge of the integrated filter cartridge 1, and the purified water finally flows out through the purified water outlet 100*c* for use by the user. In this case, even if the pure water valve 9 is opened, no pure water will flow out through the pure water outlet 100b. Then, the purified water valve 10 can be closed; since the second one-way valve limits backflow of the water, the pressure at the location of the second high pressure switch increases gradually; when the foregoing pressure reaches the set pressure p2, the second high pressure switch transmit a signal to the controller, and the controller controls the water inlet valve 3 to close and controls the booster pump 4 to stop operating. It should be understood that, the set pressure p2 of the second high pressure switch may be set according to practical requirements to better satisfy the requirement of the user.

Certainly, in other embodiments of the present disclosure, the first one-way valve and the first high pressure switch can also be disposed separately from each other, and the second one-way valve and the second high pressure switch can also be disposed separately from each other (not illustrated). It should be understood that, only the first one-way valve but no first high pressure switch can be disposed between the second port 10b and the pure water outlet 100b, and only the second one-way valve but no second high pressure switch can be disposed between the third port 10c and the purified water outlet 100c, so as to further simplify a structure of the water filtration system 100 and reduce costs.

Optionally, the water storage device 2 is configured as a water storage bag, a pressure tank or a water tank, and so on. The water storage bag or the pressure tank may be connected to the fourth port 10d, and the water tank may be disposed to the pure water flow path 102, so that the requirement of the user for a large amount of water can be satisfied. The water storage bag is foldable and easy to store, and has a small volume, and water storage bags of various specifications can be customized according to the requirement of the user to better satisfy the requirement of the user. The pressure tank is safe, reliable and economical, and furthermore, the pressure tank can utilize compressibility of air in the tank to adjust the amount of the water to be stored. The water tank will not pollute the water, thereby ensuring cleaness and hygiene of the water, and furthermore, the water tank has high strength and light weight, and a neat and artistic appearance, and is easy to clean.

Optionally, the fine filter cartridge is configured as a reverse osmosis filter cartridge or a nanofiltration membrane cartridge and the like. Since the reverse osmosis membrane can filter the bacteria, viruses, heavy metal ions and the like in the water, the reverse osmosis filter cartridge can strictly separate the water which can permeate the reverse osmosis membrane from concentrated water which cannot permeate the reverse osmosis membrane. The nanofiltration membrane can remove organic matter and chroma in the water, partially remove dissolved salts, and remove hardness of the water. Furthermore, the nanofiltration membrane filter cartridge can also strictly separate the water which can permeate the nanofiltration membrane from the concentrated water which cannot permeate the nanofiltration membrane. Thus, regardless of employing the reverse osmosis filter cartridge or the nanofiltration membrane filter cartridge, the fine filter cartridge can obtain high filtration accuracy, and the water passing through the fine filter cartridge has better water quality, thereby ensuring the water quality of the pure water and ensuring the health of the user.

After the water filtration system 100 is used for a period of time, the integrated filter cartridge 1 needs to be cleaned, in which case the pure water valve 9 and the purified water valve 10 can be closed, and the controller controls the water inlet valve 3 to open, the booster pump 4 to operate, and the waste water solenoid valve 8 to be energized (in which case the waste water solenoid valve 8 is fully opened), such that the raw water flows from the first port 10a into the integrated filter cartridge 1 to flush the integrated filter cartridge 1, and the impurities attached to the pre-filter cartridge and the fine filter cartridge of the integrated filter cartridge 1 can be removed to allow the integrated filter cartridge 1 to continue to be used, thereby extending the service life of the integrated filter cartridge 1.

Certainly, when the water filtration system 100 is not provided with any electric equipment such as the booster pump 4, the detection device, the first high pressure switch or the second high pressure switch, that is, there is no need to provide electrical energy for the water filtration system 100, the water filtration system 100 can also operate normally. For example, the water inlet valve 3 is configured as the water inlet manual valve, the pure water valve 9 is configured as the pure water manual valve, the purified water valve 10 is configured as the purified water manual valve, and the waste water valve is configured as the waste water manual valve. In this case, when the integrated filter cartridge 1 is to be cleaned, the pure water manual valve and the purified water manual valve can be closed, and the water inlet manual valve and the waste water manual valve can be opened (in which case the waste water manual valve is fully opened), such that the raw water flows from the first port 10a into the integrated filter cartridge 1 to flush the pre-filter cartridge and the fine filter cartridge successively, which can also extend the service life of the integrated filter cartridge 1.

Other constitutions and operations of the water filtration system 100 according to embodiments of the present disclosure are well known by those skilled in the art, which will not be described in detail herein.

Reference throughout this specification to "an embodiment," "some embodiments," "an illustrative embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle of the present disclosure are acceptable. The scope of the present disclosure is defined by the claims or the like.

What is claimed is:
1. A water filtration system, comprising:
a raw water inlet;
a pure water outlet;
a purified water outlet;
a waste water outlet; and
an integrated filter cartridge comprising a pre-filter cartridge, a fine filter cartridge and a post-filter cartridge, and having a first port, a second port, a third port, and a fourth port, wherein
the first port is connected to the raw water inlet, the second port is connected to the pure water outlet, the purified water outlet and the waste water outlet are both connected to the third port, and the fourth port is connected to a water storage device, a first portion of raw water entering through the raw water inlet is configured to flow out through the pure water outlet after filtered by the pre-filter cartridge, the fine filter cartridge and the post-filter cartridge successively, a second portion of the raw water entering through the raw water inlet is configured to flow out through the purified water outlet after only filtered by the pre-filter cartridge, and a third portion of the raw water entering through the raw water inlet is produced as waste water by the integrated filter cartridge and configured to flow out through the waste water outlet.

2. The water filtration system according to claim 1, wherein a water inlet valve and a booster pump are provided between the first port and the raw water inlet, and the water inlet valve is located upstream of the booster pump.

3. The water filtration system according to claim 2, wherein the water storage device is provided with a detection device, and when the detection device detects that the water storage device is not full of liquid, a controller of the water filtration system opens the water inlet valve and operates the booster pump.

4. The water filtration system according to claim 3, wherein the detection device is one selected from the group consisting of a pressure sensor and a liquid level sensor.

5. The water filtration system according to claim 2, wherein a pre-filtering mesh is disposed between the raw water inlet and the water inlet valve.

6. The water filtration system according to claim 1, wherein the third port comprises a first sub-port and a second sub-port, the purified water outlet is connected to the first sub-port through a purified water flow path, and the waste water outlet is connected to the second sub-port through a waste water flow path.

7. The water filtration system according to claim 1, wherein a first one-way valve and a first high pressure switch are provided between the second port and the pure water outlet, and the first one-way valve and the first high pressure switch are integrated together.

8. The water filtration system according to claim 1, wherein a second one-way valve and a second high pressure switch are provided between the third port and the purified water outlet, and the second one-way valve and the second high pressure switch are integrated together.

9. The water filtration system according to claim 1, wherein the water storage device is one selected from the group consisting of a water storage bag, a pressure tank, and a water tank.

10. The water filtration system according to claim 1, wherein the fine filter cartridge is one selected from the group consisting of a reverse osmosis filter cartridge and a nano-filtration membrane filter cartridge.

* * * * *